Oct. 7, 1924.
H. C. RICKETTS
FRUIT TREATING APPARATUS
Filed Feb. 14, 1922
1,511,007
2 Sheets-Sheet 2
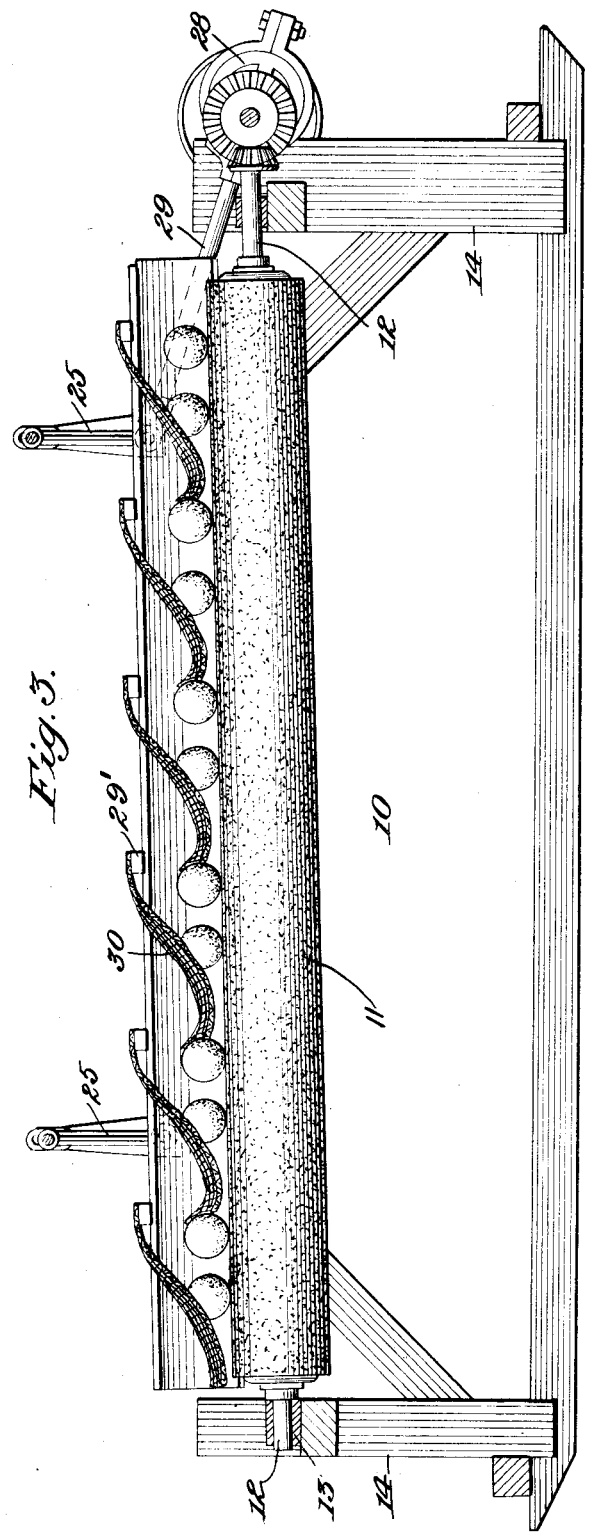
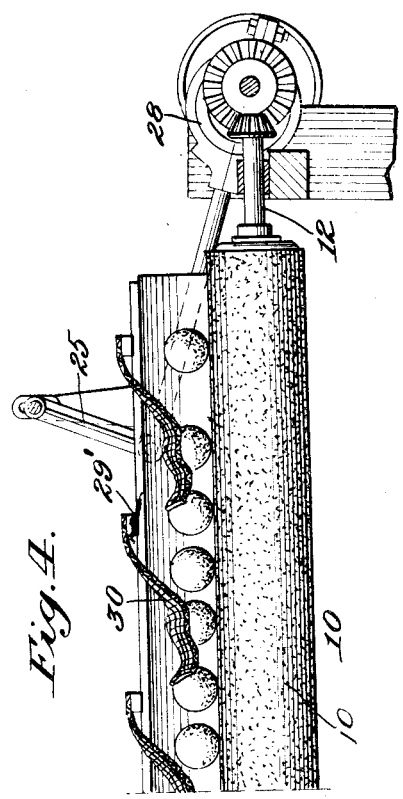
Inventor:
Homer C. Ricketts
By Stewart & McKay
his Att'ys.

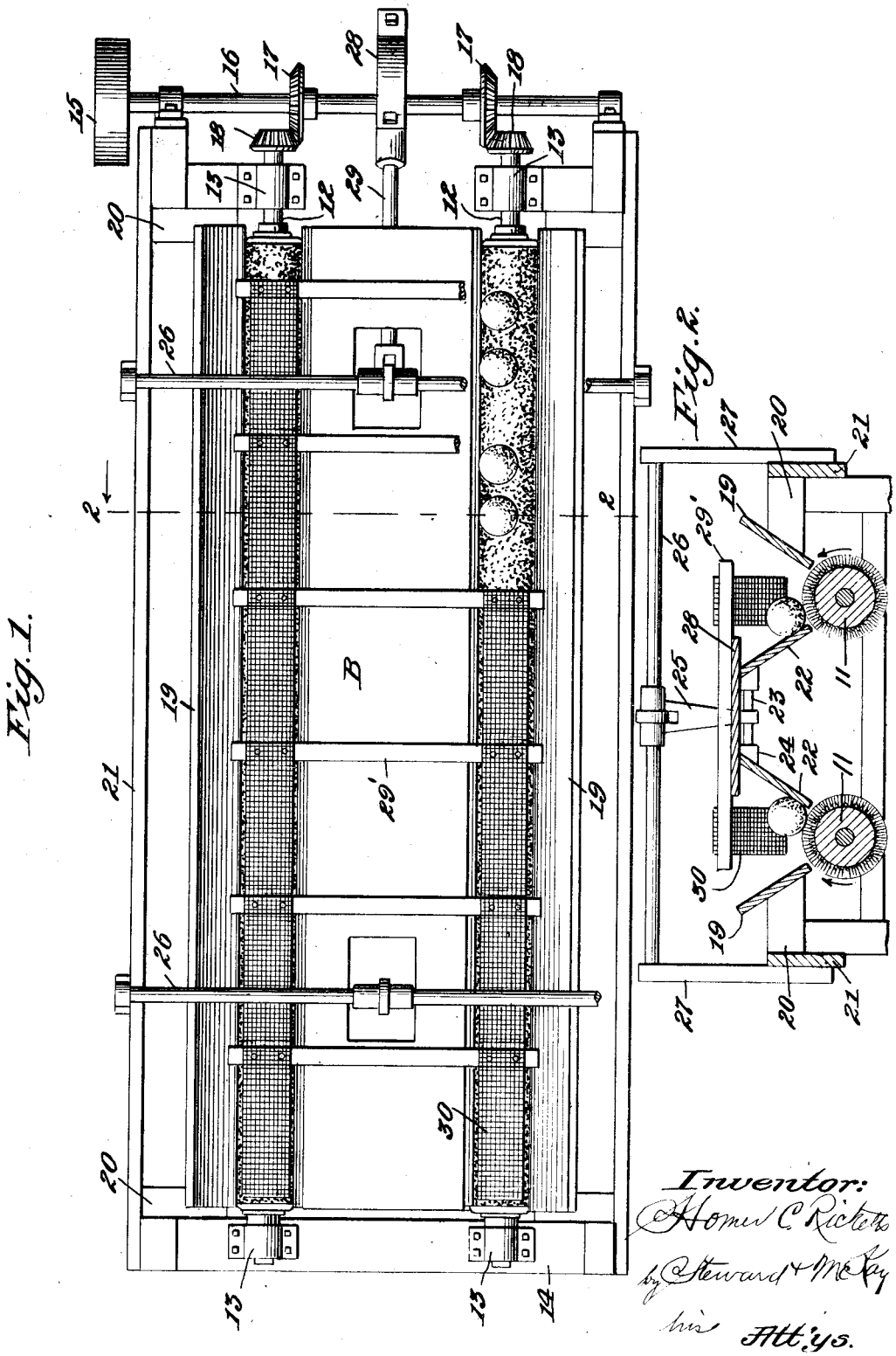

HOMER C. RICKETTS, OF WINTER HAVEN, FLORIDA, ASSIGNOR, BY MESNE ASSIGNMENTS, TO BROGDEX COMPANY, OF WINTER HAVEN, FLORIDA, A CORPORATION OF FLORIDA.

FRUIT-TREATING APPARATUS.

Application filed February 14, 1922. Serial No. 536,589.

*To all whom it may concern:*

Be it known that I, HOMER C. RICKETTS, a citizen of the United States, residing at Winter Haven, county of Polk, State of Florida, have invented certain new and useful Improvements in Fruit-Treating Apparatus; and I do hereby declare the following to be a full, clear, and exact description of the invention, such as will enable others skilled in the art to which it appertains to make and use the same.

This invention relates to fruit treating apparatus; and it relates more particularly to apparatus for preparing for market fresh fruit in a sound and readily salable condition and presenting an attractive appearance. The apparatus of the invention is especially useful in the treatment of oranges, grapefruit, and other citrous fruits which, as is well known, must be handled, packed and shipped with great care if they are to reach the consumer in good condition and appearance.

In the customary preparation of such fruit for market as heretofore practiced, the freshly picked fruit first undergoes a thorough washing to present the same with a thoroughly clean surface, generally by submergence in a vat of water and then by passing the fruit through a scrubbing apparatus which subjects it to the action of brushes in association with a water spray. From the cleansing apparatus, the fruit is delivered to a drier where care is taken to evaporate off as much as possible of the surface moisture in order to avoid facilitating development of mold or fungi discoloring the fruit or causing its decay. The fruit is delivered from the drier to a rubbing or polishing apparatus, well known types of which comprise rotary brush rolls which brush the surface of the fruit as it is fed therealong.

One of the objects of my present invention is the provision of mechanically operating rubbing or brushing means which will perform the rubbing or brushing action uniformly over the entire surface of the fruit.

A further object of the invention is the provision of mechanically operating means having such a rubbing or brushing action as to form from the proper material initially applied to the fruit after its surface has been cleaned, a thin, continuous and smooth protective or preservative coating. It has been discovered that by properly applying to citrous fruit a mixture of a sealing and waterproofing material, such as paraffin, with a volatile liquid vehicle, such as gasolene, the fruit may be provided with a very thin but continuous coating that protects it from rotting, prevents it from withering, and in general maintains its original appearance, soundness, freshness and flavor. The apparatus of the present invention, by the uniformity and certainty of its rubbing action over the entire surface of the fruit, is particularly adapted to form the thin, continuous and smooth coating referred to.

Broadly speaking, the novel apparatus comprises means of some description for brushing or otherwise rubbing the surface of the fruit and means associated therewith for causing rotative movements of the fruit on various axes progressively presenting different areas of its surface to the rubbing or brushing action until the entire surface has been rubbed or brushed.

The underlying principles of the invention can be readily understood from the description hereinafter given of a typical embodiment in which said principles are incorporated in a form that not only works satisfactorily but that has the further advantage of utilizing standard fruit handling machinery with only relatively slight alterations to confer upon it the novel capabilities here in question. It is to be understood, however, that the typical embodiment hereinafter described is merely illustrative and that within the broad scope of the invention are included other specific constructions capable of functioning in accordance with the principles here involved.

Such a typical embodiment is illustrated in the accompanying drawings, wherein:

Fig. 1 is a top plan view of the apparatus, with certain parts broken away;

Fig. 2 is a vertical tranverse section along the line 2—2 of Fig. 1, looking in the direction of the arrow;

Fig. 3 is a side elevational view of the apparatus with certain parts of the frame removed and other parts shown in section to expose the brush rolls and certain reciprocating mechanism to view, and showing one position in the stroke of that mechanism; and trated in the drawings, 10 designates generally a fruit brushing or polishing device or machine of any suitable character, the particular device or machine here shown being in a general way similar to what is known in the fruit packing industry as a polisher of the Skinner type, but differing therefrom in important respects hereinafter to be pointed out. In the type of machine here shown, a plurality of elongated brush rolls 11, in the present instance two in number, are mounted in parallel arrangement in a series that is horizontal transversely and slightly inclined longitudinally from the upper or receiving end, shown at the right in Figs. 1, 3 and 4, downwardly to the delivery end, so as to feed the fruit along the brush surfaces. The brush rolls are generally of horsehair, and are mounted for rotation upon spindles 12, journaled in bearings 13 in the frame 14 of the machine, to be driven by the driving pulley 15 through the driving spindle 16 having gears 17 thereon coacting with gears 18 upon the brush spindles.

A runway for the fruit during the brushing action over the surface of each brush roll longitudinally, is provided by the upper-surface presentation of each brush roll and flat guiding or restraining boards inclined thereto and cooperating therewith. The outer boards 19, for the two brush rolls of the series in the illustrative apparatus, are immovably fixed in position, being supported in any suitable way by the frame of the apparatus, as for example from brackets 20 secured to the side boards 21 of the frame. The outer boards 19 function primarily to guide and maintain the fruit upon the upper-surface presentations of the brush rolls. The inner boards 22 are also mounted to always present their planes at an unvarying inclination toward the brush rolls, complementary to the inclination of the outer boards, as shown in Fig. 2, and in addition are mounted for longitudinal reciprocation. The brush rolls, as shown by the arrangement of the gears in Fig. 1, and as shown by the arrows in Fig. 2, are rotated in such directions of engagement with the fruit, and each opposite to the other, as to impel the fruit toward and against the inner boards 22. The inner boards 22 by their inclined positions function as do the outer boards 19 to guide and maintain the fruit upon the upper-surface presentations of the brush rolls, but in addition, by their reciprocation in the direction of their lengths, they function as turning boards to give the fruit engaging therewith rotative movements at right angles to the movements imparted thereto by the brush rolls. In the illustrative apparatus faces of the boards. In the illustrative apparatus, two such spacing and connecting devices are shown spaced longitudinally of the boards 22 although it is obvious that as many such devices may be employed as are found desirable. The connecting rods 23 are mounted in the lower depending ends of rocker arms 25, one for each rod, journaled upon horizontal transverse rods 26 mounted each in a pair of arms 27 extending upwardly from the side frame 21 of the apparatus. By the arrangement described, the inclined boards 22 are in effect mounted upon the rocker arms 25 depending from the transverse supporting rods 26, to partake of a swinging motion constituting in substantial effect a reciprocation in the direction of the longitudinal extent of the boards. An eccentric 28 and pitman 29 connected to one of the rods 23 serves to drive the boards 22 in their reciprocating movement.

The mechanical features thus far described do not differ markedly from the well-known Skinner type of polisher. In using such Skinner polisher, the fruit is fed to the upper or receiving ends of the elongated and inclined runways formed by the upper-surface presentations of the rotating brush rolls and the pair of oppositely inclined boards cooperating with each. The inclination of these runways, tends to impart a forward rolling movement to the fruit longitudinally of the brush rolls upon a substantially horizontal axis; the rotation of the brush rolls, tends to impart a rolling movement to the fruit transversely of the rolls upon horizontal axis at right angles to the axis of the first mentioned movement; and the reciprocation of the turning boards 22, tends to turn or rotate the fruit upon a substantially vertical axis at right angles to the first two mentioned axes of movements. All of these rotation impelling elements therefore produce a variety of movements of rotation of the fruit about varying axes, resulting in the progressive presentation of differing areas of its surface to the brushes.

To still further vary the movements of rotation of the fruit so as to increase the areas of presentation of its surface to the brushes, it has been customary in some of the Skinner type of polishers to employ a strip of canvas or similar textile fabric of sufficient length to be secured along substantially the entire upper edge of the turning board 22, one for each board, and in form ruffled or fluted transversely of its length, to extend with one free side only in limp condition into the runway in position to be engaged by the passing fruit. The canvas or fabric strip having its under surface of irregular contour and with which the fruit came into frictional engagement in its travel down the runway, was relied upon to impart a variety of rolling movements to the fruit.

The combination of rotation-impelling elements referred to has not been found to be such, however, as to sufficiently and uniformly present all areas of the surface of the fruit to the brushing action, particularly when a brushing action is relied upon to form from a coating material initially applied to the fruit the protective and preservative coating heretofore referred to. Accordingly, my invention contemplates a novel combination of movement-impelling elements so acting upon the fruit as to provide with greater certainty for the presentation of its entire surface to the brushing action.

The novel combination referred to may take many different concrete forms, although in the present illustrative embodiment of the invention, in which a Skinner type of polisher is employed, the combination of elements already described above is utilized to form a part of the complete novel apparatus. A flat board or supporting plate B is bridged across and mounted upon the upper edges of the pair of turning boards 22. Upon this in uniformly spaced positions cross-pieces 29' are secured projecting upon each side transversely over and above the brush rolls and substantially across the brush surfaces of the runways. Upon each projecting end portion of the pieces 29' are secured flexible strip elements 30.

The strip elements 30 are of a width sufficient to engage and partially wrap about the fruit in the runways and of substantially greater length than width; and in this particular instance each strip element is secured only at one end to a projecting portion of a cross-piece 29', to present free sides and an unsecured end depending into the runways and over the fruit passing therethrough. These strip elements may be of any material of sufficient body and such texture as to cause turning movements of the fruit by frictional engagement therewith. Strips of canvas or carpet, among other woven fabric materials, are suitable for the purpose. In a typical embodiment of the invention, such as is illustrated in the drawings, the cross-pieces or cleats 29' may advantageously be placed approximately one foot apart, and the strip elements made of a length somewhat greater so that they overlap as shown in Figs. 1, 3 and 4, but these details of arrangement are not essential to the effectiveness of the apparatus. Nor is it essential, in the broader aspects of the invention, that one end of each of the strip elements be free, although this offers certain advantages and is preferred.

The strip elements referred to are designed to be moved in forward and backward strokes in the brush runways; and in the illustrative apparatus, the reciprocating turning boards 22 with their driving mechanism constitute the means for such movement because of the mountings of the cross-pieces 29' to which the strip elements are secured, as heretofore described. Upon the forward stroke of a strip element, that is in the direction of the advance of the fruit downwardly along the runways, and to the left as viewed in Fig. 4, its free end or intermediate portion or both abut against one or more pieces of fruit, resulting in a turning movement of the fruit and also in a wrapping of the flexible element about the upper portion of a piece of fruit, as shown in Fig. 4. Such wrapping also provides a close frictional engagement of the flexible element with the fruit over a substantial area of its surface, resulting, upon the return stroke of the element, shown as toward the right in Fig. 3, in another turning movement imparted to the fruit. While the secured ends of the elements 30 partake of reciprocatory movements in a definitely defined path, the depending free portions, because of their flexibility and because of the varying positions of the pieces of fruit they encounter, move in no definitely defined paths. Hence, not only does each element impart a great variety of movements of rotation to the pieces of fruit which it successively encounters, but all of the elements on each side which a piece of fruit successively encounters greatly increase the variety of turning movements about ever changing axes, the result being that by the time a piece of fruit has traversed the runway, no substantial possibility exists of its not having had its entire surface presented to the action of the brush rolls.

What I claim is:

1. Fruit treating apparatus comprising, in combination, brushing means and means including a reciprocatory member associated therewith to direct the fruit in a predetermined path in operative relation with said brushing means, and a plurality of flexible strip elements each supported by said reciprocatory member adjacent said path to present a limp body portion with opposite free side edges in said path in position to yieldingly and frictionally engage said fruit advancing along said path.

2. Fruit treating apparatus comprising, in combination, brushing means and means associated therewith to direct the fruit in a rolling movement in a predetermined path in operative relation with said brushing means, and a plurality of flexible strip elements each having one end mounted for reciprocatory movement adjacent said path and arranged to project with opposite free to vary the axes of rotation of its rolling movement along said path, and means for imparting said reciprocatory movement.

3. Fruit treating apparatus comprising, in combination, brushing means having a revolving brush surface and means including a reciprocatory member associated therewith providing a runway for the fruit upon said brush surface transversely of its path of revolution and permitting rolling movement of the fruit along said runway and a flexible strip element supported by said reciprocatory member above said runway and having a body portion depending from said mounting into said runway with opposite free side edges to vary the axis of rotation of the rolling movement of said fruit by yielding frictional engagement therewith.

4. Fruit treating apparatus comprising, in combination, brushing means having a revolving brush surface and means associated therewith providing a runway for the fruit upon said brush surface transversely of its path of revolution permitting a rolling movement of the fruit along said runway, a supporting element mounted in position over said runway for reciprocatory movement in the line of direction of said runway, and a flexible strip element secured to said supporting element and arranged to depend therefrom to yieldingly and frictionally engage fruit traversing said runway, and means for imparting said reciprocatory movement.

5. Fruit treating apparatus as set forth in claim 4, wherein said strip element is of textile material.

6. Fruit treating apparatus comprising, in combination, an elongated rotating brush roll and means associated therewith arranged to direct travel of the fruit over the surface of said roll in the general direction of its length, and a plurality of flexible strip elements arranged in succession to overlie said brush roll in the direction of its length and adapted to frictionally engage fruit passing along said roll.

7. Fruit treating apparatus comprising, in combination, an elongated rotating brush surface of said roll in the general direction of its length, a plurality of supporting elements mounted above said brush roll in a series extending in the direction of the length of said roll and for reciprocatory movement in the line of said direction, a plurality of flexible strip elements secured to said supporting elements and arranged to depend therefrom upon said brush roll to yieldingly and frictionally engage said fruit, and means for reciprocating said supporting elements.

8. Fruit treating apparatus comprising, in combination, an elongated brush roll, and means associated therewith arranged to direct travel of the fruit in a path over the surface of said roll in the general direction of its length, a supporting element mounted in position over said path of travel of said fruit and for reciprocatory movement in the direction of said path, and a strip element secured to said supporting element and arranged to depend therefrom to yieldingly and frictionally engage fruit traveling in said path, and means for reciprocating said supporting element.

9. Fruit treating apparatus comprising, in combination an elongated rotating brush roll inclined from the horizontal in the direction of its length, juxtaposed guide boards mounted lengthwise of said roll and inclined thereto to provide with the upper-surface presentation of said rotating brush roll a runway for the fruit, one of said guide boards being mounted for reciprocatory movement in the direction of its length and means for imparting said reciprocatory movement, means for rotating said brush roll in a direction to roll said fruit against said reciprocatory guide board, supporting elements spaced along said reciprocatory guide board and extending over said runway and a flexible fabric strip for each supporting element having one end secured thereto and depending with free sides into said runway into yielding frictional engagement with the fruit advancing therethrough.

In testimony whereof I hereunto affix my signature.

HOMER C. RICKETTS.